United States Patent [19]

Yamamuro et al.

[11] Patent Number: 5,309,425
[45] Date of Patent: May 3, 1994

[54] SIGNAL PROCESSING CIRCUIT FOR OPTICAL DISK APPARATUS

[75] Inventors: Mikio Yamamuro, Zushi; Akihiko Doi, Tokyo, both of Japan

[73] Assignee: Kabushiki Kaisha Toshiba, Kawasaki, Japan

[21] Appl. No.: 907,126

[22] Filed: Jul. 1, 1992

[30] Foreign Application Priority Data

Jul. 3, 1991 [JP] Japan .................. 3-163092

[51] Int. Cl.⁵ ................. G11B 7/00; G06F 15/00
[52] U.S. Cl. ..................... 369/124; 369/120
[58] Field of Search .......... 369/124, 120; 360/19.1, 360/35.1; 358/341, 342, 343

[56] References Cited

U.S. PATENT DOCUMENTS

5,318,500 8/1992 Haikawa et al. ............. 358/341

Primary Examiner—Paul M. Dzierzynski
Assistant Examiner—Kim-Kwok Chu
Attorney, Agent, or Firm—Finnegan, Henderson, Farabow, Garrett & Dunner

[57] ABSTRACT

A signal processing circuit for a disk apparatus with an optical head, which causes photodiodes to detect light acquired by irradiating light from a laser diode on a disk that has an address portion and data portion recorded thereon, and performs photoelectric conversion of the light. A level converter alters the level of the signal detected by each photodiode and provides an output signal. A detector detects a level of the output signal by switching time constants between the address portion and data portion. Using a bias corresponding to the detected level, the levels of signals detected by the photodiodes are changed.

2 Claims, 9 Drawing Sheets

SIGNAL PROCESSING CIRCUIT FOR OPTICAL DISK APPARATUS

BACKGROUND OF THE INVENTION

1. Field of the Invention

The present invention relates to a signal processing circuit for, for example, an optical disk apparatus which records information on an optical disk or reproduces information therefrom.

2. Description of the Related Art

Various optical disk apparatuses have been developed which cause a semiconductor laser oscillator (light source) in an optical head to irradiate a laser beam on an optical disk to form pits thereon, thereby recording data on the optical disk, or to convert data recorded on the optical disk into an electric signal by means of a detector (photodiode) provided in the optical head and then convert the signal a video signal (data signal) before reading it out.

In such an optical disk apparatus, an operational amplifier converts a data signal (current signal) picked up by a photodiode into a voltage signal. The voltage signal from this operational amplifier is processed by a signal processing circuit.

The amplitude of the data signal may become smaller relative to that of a large-amplitude signal originated from minute dust deposited on the disk and/or scratches thereon, thus greatly altering the level of a signal at a pit's edge portion. To digitize such a signal with high accuracy, the signal processing circuit performs the following operation.

The signal processing circuit detects the peak of the signal at the pit's edge portion, and feeds the detected peak back to the input side to adjust the pit edge level of the data signal output from the signal processing circuit. At this time an automatic bias controller is used to make the level of the output signal uniform. The data signal from the signal processing circuit is digitized to be demodulated for reproduction of the recorded data.

There is, however, a gap of several bits between the header portion (address portion) and the data portion in the signal read out from the disk. Unless the automatic bias controller of the above signal processing circuit has as quick a response as possible in the header portion, the head of the data (or the leading edge of the data stream) may not be read out due to an improper bias response.

SUMMARY OF THE INVENTION

It is therefore an object of the present invention to provide a signal processing circuit for a disk apparatus, which has a quick response in the header portion so as to be able to accurately read out the head of data.

A signal processing circuit according to the present invention is adapted to an optical head which has a detecting section to detect an optical signal acquired by irradiation of light from a light source on a disk that has an address portion and data portion recorded thereon, and performs photoelectric conversion of the optical signal. The signal processing circuit comprises an output section for converting a level of the output signal from the detecting section to output a converted signal; a level detecting section for detecting a level of the converted signal from the output section by changing time constants used to the level detection between the address portion and data portion; and a section for altering the level of the output signal from the output section in accordance with the signal level detected by the level detecting section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENT

A preferred embodiment of the present invention will now be described referring to the accompanying drawings.

Figure 1A:
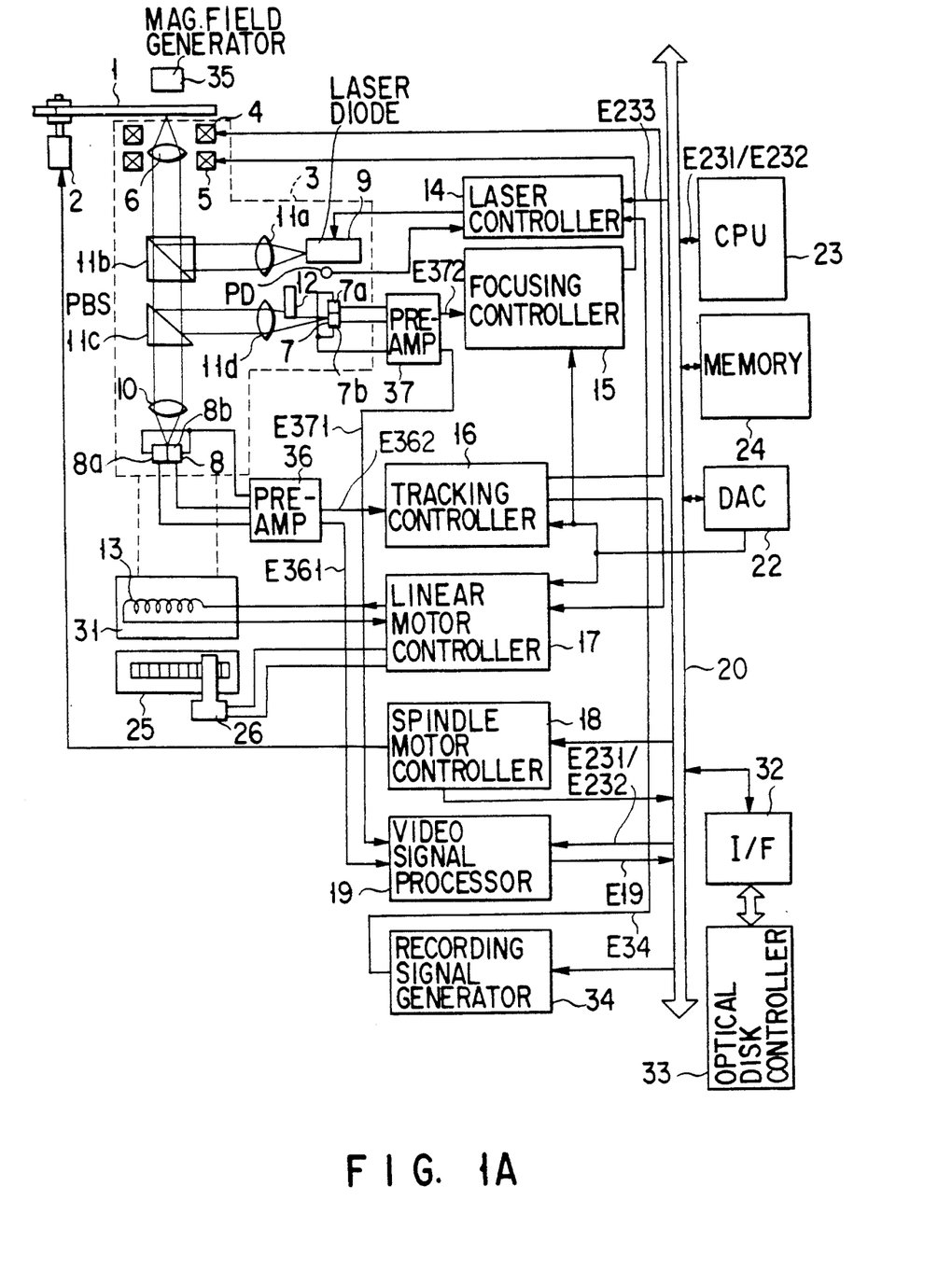
FIG. 1A is a schematic block diagram of an optical disk apparatus according to one embodiment of the present invention.

FIG. 1A illustrates a disk apparatus in which convergent light is irradiated to a disk 1 such as an optical disk or a magneto optical (MO) disk, to thereby conduct data recording, data reproduction, or data erasing.

The disk 1, which has spiral grooves (recording tracks) formed on its surface, is driven at a constant angular velocity by a spindle motor 2 under the control of a spindle motor controller 18.

Figure 1B:
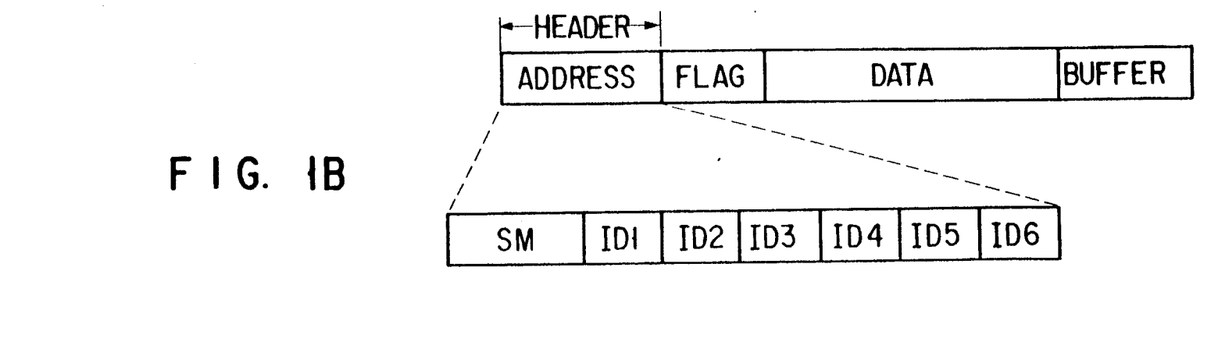
FIG. 1B is a diagram showing an example of the sector format of an optical disk for use in the apparatus shown in FIG. 1.

As shown in FIG. 1B, multiple sectors ID1 to ID6 are allocated on the disk 1 with a sector mark SM as a reference. These sectors form an address portion and are used as address references. The address portion represents the physical block address of a sector on the disk, and the flag portion serves to indicate whether the sector is a data-written block, a defect or bad block, or a data-erased block, etc. The data portion is a region where a user can write whatever data is desired. The buffer is provided to prevent data writing at the head of the address portion of the next sector even when the rotation of the disk varies at the time data is written in the data region. In the data portion on the disk 1, information of various lengths can be recorded over multiple blocks; for example, 300,000 blocks are to be formed in 36,000 tracks on the disk 1.

The recording capacity per block of the disk 1 is constant, and the number of sectors constituting one block decreases as the block position moves from the inner periphery (rotational axis side) of the disk toward the outer periphery. At the start position of the block is provided a block header (header portion) including the block number, track number, and sector position. This header portion is recorded, for example, by a manufacturer at the time the disk 1 is produced. Following the header portion is the data portion where data is to be recorded.

When each block on the disk 1 does not end at the sector-to-sector transitional point, a block gap is provided so that each block should start from one sector-to-sector transitional point and end at the next proper sector to-sector transitional point.

Information recording, reproduction, or erasure to the disk 1 is carried out by an optical head 3. This optical head 3 is secured to a drive coil 13 which forms a movable section of a linear motor 31, and is connected to a linear motor controller 17.

Connected to this linear motor controller 17 is a linear motor position sensor 26, which senses an optical scale 25 provided on the optical head 3 so as to output a position signal representing the position of the optical head 3.

The fixed section of the linear motor 31 is provided with a permanent magnet (not shown), so that as the drive coil 13 is excited by the linear motor controller 17, the optical head 3 moves in the radial direction of the disk 1.

The disk 1 uses a recording film of a type which forms pits by ablation, but may by of a type which utilizes a phase change or a multilayered recording film.

A recording/reproducing magnetic field generator 35 formed of an electromagnet or a permanent magnet is disposed at a portion to face the optical head 3 with the disk 1 in between. This magnetic field generator 35 is designed as to be able to invert the polarity of the generated field in accordance with a signal associated with writing of pits to be recorded or erasing of recorded pits. This magnetic field generator 35 also may be provided on the optical head side.

An objective lens 6 is supported on the optical head 3 by means of a wire or leaf spring (neither shown). The objective lens 6 is movable in the focusing direction (direction of the optical axis of the lens) by a drive coil 5, and movable in the tracking direction (direction perpendicular to the optical axis of the lens) by a drive coil 4.

A laser beam, generated by a laser diode (a semiconductor laser oscillator) 9 driven by a laser controller 14, is irradiated on the disk 1 via a collimator lens 11a, a half prism 11b, and the objective lens 6. The reflection light from the disk 1 passes through the objective lens 6 and the half prism 11b, and enters a half prism (polarized beam splitter) 11c to be split into two components. One of the split light components is guided via a focusing lens 10 to a photosensor 8. The photosensor 8 comprises two photodiodes 8a and 8b serving as a pair of tracking position sensors.

The other light component split by the half prism 11c is led via a lens 11d and a knife edge 12 to a photosensor 7. The photosensor 7 comprises two photodiodes 7a and 7b serving as a pair of focusing position sensors.

Provided in the vicinity of the laser diode 9 is a photodiode PD serving as a light intensity monitoring sensor which detects the amount of the light from the laser diode 9. A detection signal (monitor current) from the photodiode PD is supplied to the laser controller 14.

The photodiodes 8a and 8b of the photosensor 8 are connected to a preamplifier 36, and the photodiodes 7a and 7b of the photosensor 7 to a preamplifier 37.

The preamplifier 36 outputs a voltage signal (data signal) corresponding to header data or recording data to the disk 1 of a write once read many (WORM) type in response to the detection currents from the photodiodes 8a and 8b, and outputs a tracking signal (track error signal) concerning the tracking point of the laser beam.

The preamplifier 37 outputs a voltage signal (data signal) corresponding to header data or recording data to the disk 1 of a rewritable type (magneto optical disk) in response to the detection currents from the photodiodes 7a and 7b, and outputs a focusing signal (focus error signal) concerning the focusing point of the laser beam.

A tracking signal E362 from the preamplifier 36 is supplied to a tracking controller 16. A track error signal from the tracking controller 16 is supplied to the tracking drive coil 4 as well as the linear motor controller 17.

A focusing signal E372 from the preamplifier 37 is supplied to a focusing controller 15. The focusing controller 15 sends its output signal to the focusing drive coil 5 so that the laser beam is always in focus to the target area on the disk 1.

A data signal (voltage value) E361 from the preamplifier 36 reflects the corrugation of the pits (header data or recorded data) recorded on the disk (WORM type) 1. The data signal E361 is supplied to a video signal processor 19, which in turn reproduces address data (track number, sector number, etc.) as header data and image data.

A data signal (voltage value) E371 from the preamplifier 37 reflects the corrugation of the pits (recorded data) recorded on the disk (rewritable MO disk) 1. The data signal E371 is supplied to the video signal processor 19, which in turn demodulates the signal E371 to reproduce image data.

A recording signal generator 34 is provided in the preceding stage of the laser controller 14. The recording signal generator 34 serves as a modulator for modulating recorded data, supplied from an optical disk controller 33 via an interface 32, to provide a record pulse.

In response to a control signal E233 from a CPU 23, the laser controller 14 causes the laser diode 9 to generate a laser beam corresponding to the amount of reproduced light. In the generation of the laser beam with the amount of reproducing light, the laser diode 9 is driven in response to a recording pulse (original signal) E34 supplied from the recording signal generator 34, and generates a laser beam with the amount of recording light. The laser controller 14 controls the amount of output light from the laser diode 9 by means of the monitor current from the photodiode PD.

A video signal (demodulation signal) E19 from the video signal processor 19 is sent to the optical disk controller 33 after the error correction, etc. are executed in the interface 32.

The disk apparatus further comprises a D/A converter (DAC) 22 for exchange of information between the CPU 23 and the focusing controller 15, the tracking controller 16 and the linear motor controller 17.

The tracking controller 16 shifts the objective lens 6 in accordance with a track jump signal sent from the CPU 23 via the DAC 22, so that the laser beam is shifted by one track.

The laser controller 14, the focusing controller 15, the tracking controller 16, the linear motor controller 17, the spindle motor controller 18, the video signal processor 19, the recording signal generator 34, etc. are controlled by the CPU 23 though a bus line 20. The CPU 23 executes a predetermined operation according to a program stored in a memory 24.

Figure 2A:
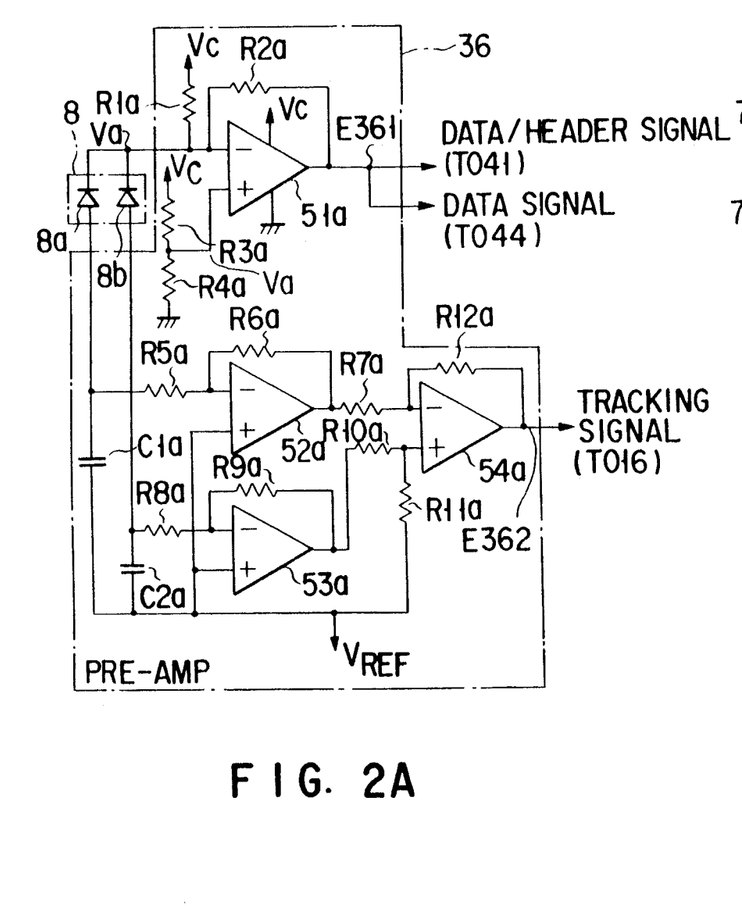
FIG. 2A is a circuit diagram showing a specific example of a first preamplifier in FIG. 1A.

The preamplifier 36 outputs the voltage signal E361 corresponding to the data signal or the header signal, based on currents from the photodiodes 8a and 8b, and also outputs the voltage signal E362 as the tracking signal. The preamplifier 36 comprises a high-speed operational amplifier 51a, a low-speed operational amplifiers 52a and 53a, a differential operational amplifier 54a, resistors R1a to R12a, and capacitors C1a to C2a, as shown in FIG. 2A.

Signals from the cathodes of the photodiodes 8a and 8b are sent to the inverted input terminal of the high-speed operational amplifier 51a, so that the current flowing across the photodiode 8a, 8b is converted into a voltage by means of the resistor R1a. The high-speed operational amplifier 51a receives a potential Va acquired through the resistors R3a and R4a at its non-inverted input terminal. Because of the negative feedback (NFB) action via the resistor R2a, the potential at the inverted input terminal is also the same as Va. The low-speed operational amplifiers 52a and 53a perform current-voltage conversion on signals from the anode side of the photodiodes 8a and 8b to produce the tracking signal.

By properly setting a bias voltage $V_{REF}$ of the preamplifier 36, the potential (Va) at the inverted input terminal of the high-speed operational amplifier 51a may be raised to about 10V. Suppose that the voltage $V_{REF}$ is set to apply a bias of 4V to the anodes of the photodiodes 8a and 8b, and that the source voltage Vc and the voltage Va obtained from the resistors R3a and R4a are so selected that the output signal E361 of the high-speed operational amplifier 51 has a potential around 6V. Then, the voltage Va (6V) at the inverted input terminal of the high-speed operational amplifier 51 will be higher than the voltage $V_{REF}$. A reverse bias (about 2V) is therefore applied to the photodiodes 8a and 8b, acquiring a wider signal frequency response range for photoelectric conversion of the diodes 8a and 8b.

The anode side of the photodiode 8a is connected to the inverted input of the low-speed operational amplifier 52a via a bypass circuit comprising a capacitor C1a and a resistor R5a, while the anode side of the photodiode 8b is connected to the inverted input of the low-speed operational amplifier 53a via a bypass circuit comprising a capacitor C2a and a resistor R8a.

Even when a fast signal runs across the photodiodes 8a and 8b, the low-speed operational amplifiers 52a and 53a do not respond to this fast signal, but the high-frequency components of the signals from the photodiodes 8a and 8b flow through the capacitors C1a and C2a. In other words, the impedance of each of the capacitors C1a and C2a reduces at a high frequency, permitting high-frequency signals to effectively flow across the photodiodes 8a and 8b. Accordingly, the fast current signals running across the photodiodes 8a and 8b can be picked up as fast data signals from the cathodes of the photodiodes 8a and 8b, using the high-speed operational amplifier 51a.

Figure 2B:
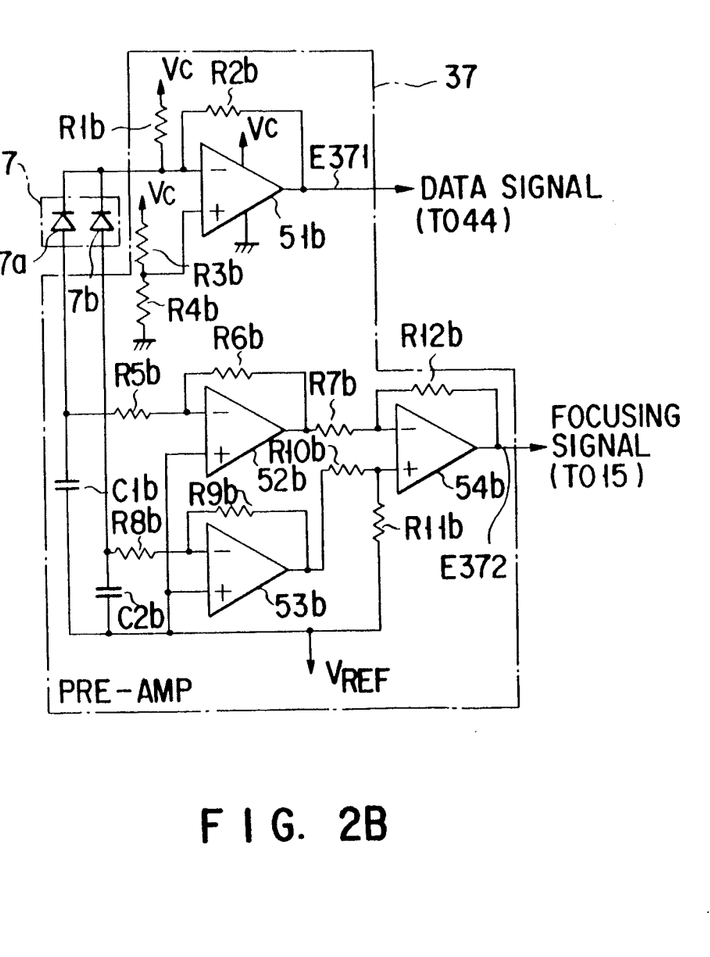
FIG. 2B is a circuit diagram showing a specific example of a second preamplifier in FIG. 1A.

The preamplifier 37 outputs the voltage signal E371 corresponding to an MO data signal, using currents from the photodiodes 7a and 7b, and also outputs the voltage signal E372 as a focusing signal. The preamplifier 37 has the same structure as the preamplifier 36. (51a to 54a, R1a to R12a, and C1a and C2a in FIG. 2A respectively correspond to 51b to 54b, R1b to R12b, and C1b and C2b in FIG. 2B.).

The video signal processor 19 demodulates a voltage signal corresponding to the data signal or header signal from the preamplifier 36, or the MO signal from the preamplifier 37 into a reproduction signal. The video signal processor 19 comprises a header signal processor 41, digitizers 42 and 45, a demodulator 43, an MO data signal processor 44, all shown in FIG. 3, and a reference voltage generator 90 shown in FIG. 7.

Figure 3:
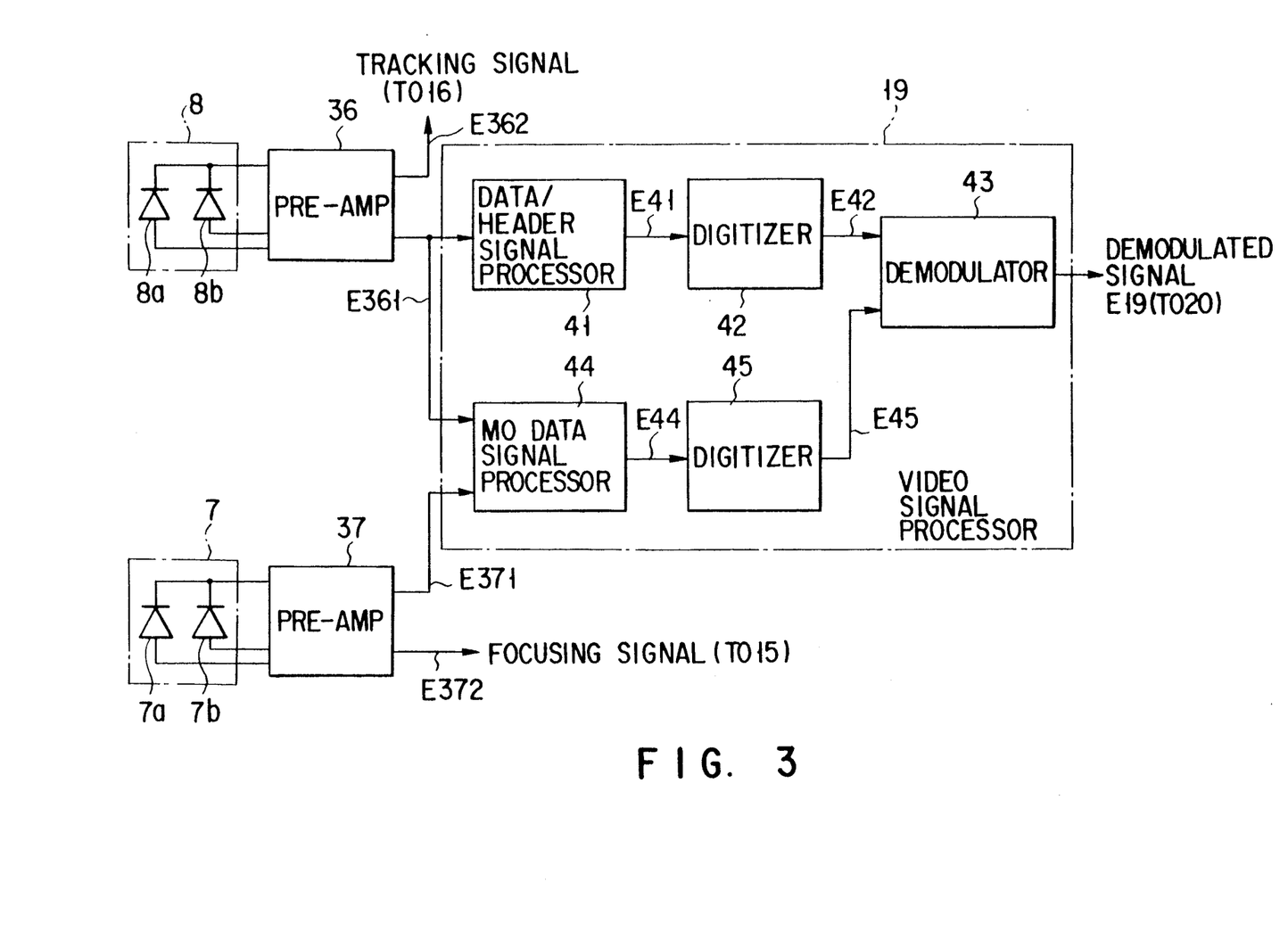
FIG. 3 is a block diagram illustrating a specific example of a video signal processor in FIG. 1A.

When the pit data is required to be digitized accurately, even if the amplitude of the data signal becomes relatively smaller than that of a signal generated by minute dust deposited on the disk 1 and/or scratches thereon and the signal level at the pit's edge portion is largely changed, then the data/header signal processor 41 detects the peak of the signal at the pit's edge portion, and feeds it back to the input side to adjust the pit edge level of the non-digitized data signal.

The data/header signal processor 41 processes the header/data signal E361 supplied from the amplifier 51a in the preamplifier 36. The frequency-response bandwidth control is added to the feedback loop in the preamplifier 36 while peak detection is performed, so that the data/header signal processor 41 can perform a proper feedback operation in accordance with the number of revolutions of the disk 1 and its recording density.

Figure 4A:
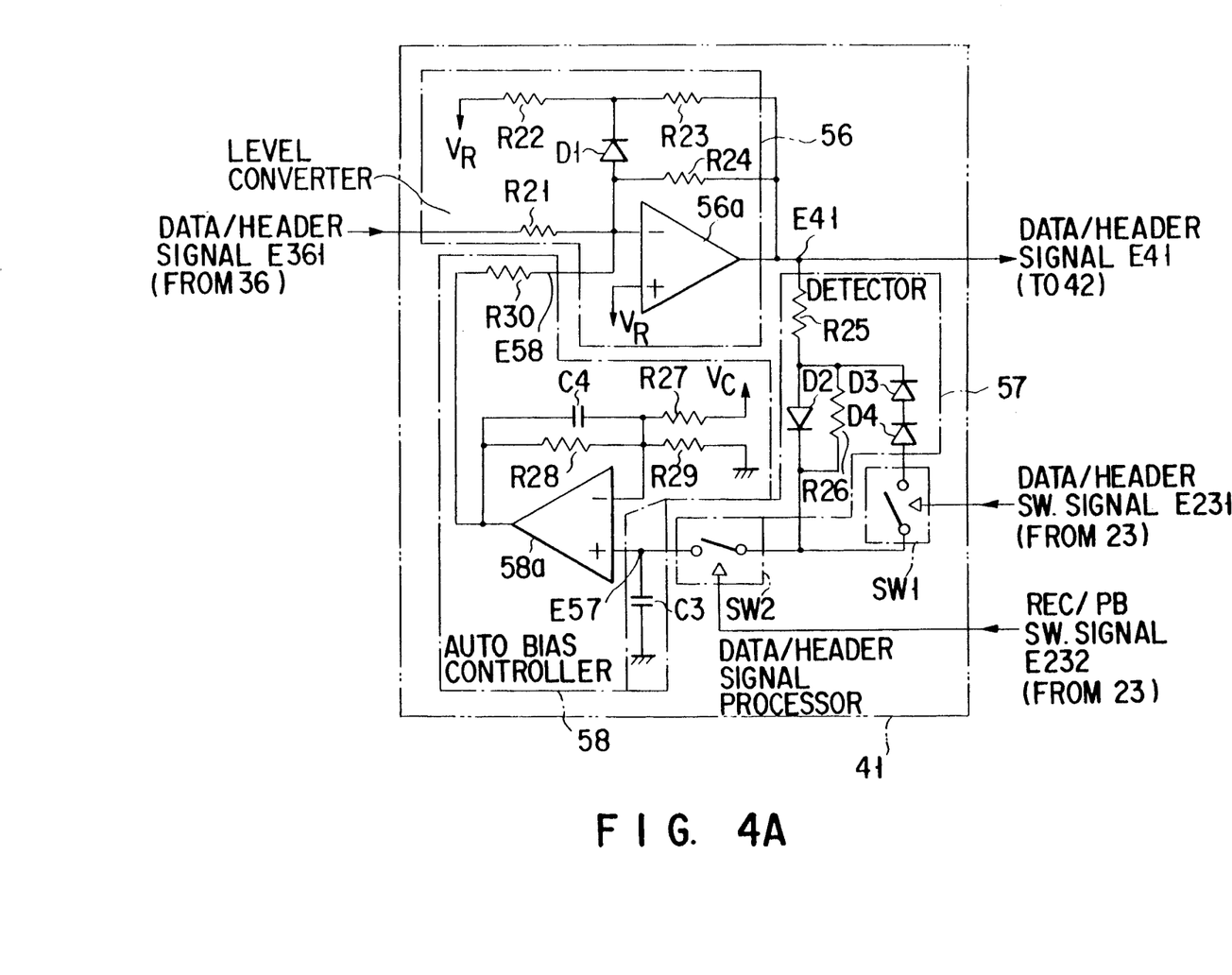
FIG. 4A is a circuit diagram illustrating a specific example of a data/header signal processor in FIG. 3.

The data/header signal processor 41 comprises a level converter 56, a detector 57, an auto bias controller 58, and switches SW1 and SW2, as shown in FIG. 4A.

Figure 4B:
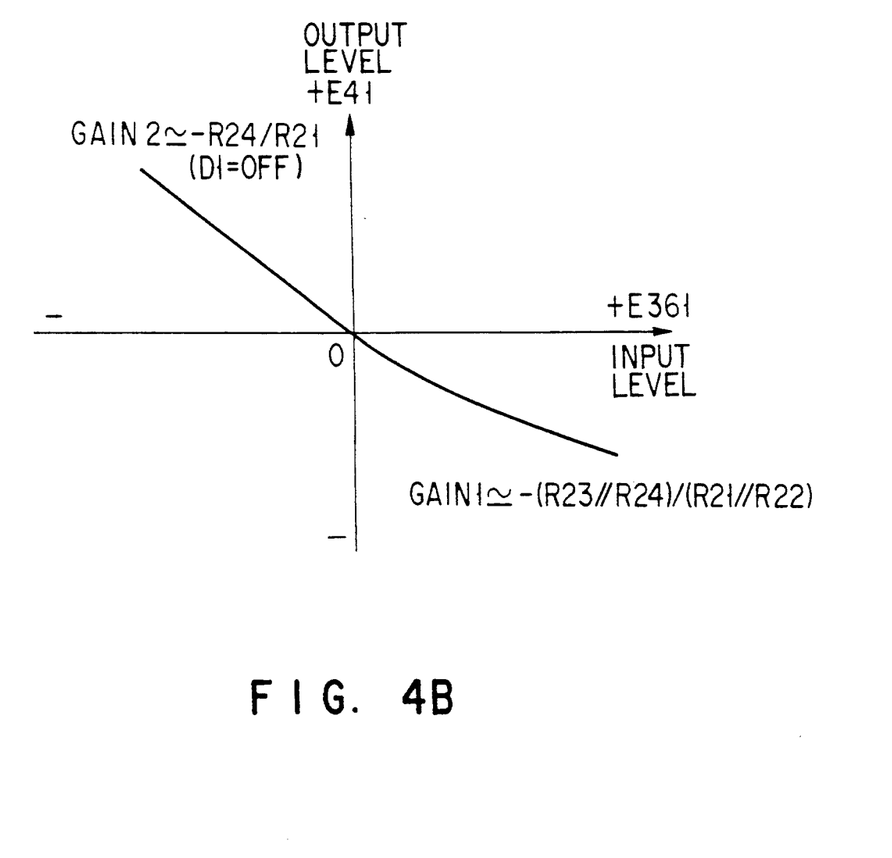
FIG. 4B presents a graph exemplifying the input/output characteristic of a level controller in FIG. 4A.

The level converter 56 performs level conversion on the header/data signal E361 sent from the amplifier 51a in the preamplifier 36. The level converter 56 comprises an amplifier 56a, resistors R21 to R24, and a diode D1, as shown in FIG. 4A. When the potential of the signal E361 is at a higher level than a non-inverted input level VR, the diode D1 is turned on. When the potential of the signal E361 is at a lower level than the non-inverted input level VR, the diode D1 is turned off. The level converter 56 therefore has an input/output characteristic as shown in FIG. 4B. In other words, the level converter 56 serves as a limiter (i.e., "gain 1" is small) with respect to the received signal E361 of a positive level.

The detector 57 detects the peak of a signal E41 supplied from the level converter 56, and comprises resistors R25 and R26, a capacitor C3, and a diode D2 as shown in FIG. 4A.

In response to a peak detection signal E57 from the detector 57, the automatic bias controller 58 controls the bias of the level converter 56. The automatic bias controller 58 includes an operational amplifier 58a, resistors R27 to R30, and a capacitor C4 for controlling a frequency response range, as shown in FIG. 4A.

Further, the automatic bias controller 58 is designed to feed back the signal E57 from the detector 57 representing the level of the signal E41, to the input terminal of the level converter 56. The level of a feedback signal E58 output from the controller 58 changes at a speed corresponding to a time constant (R25·C3) for the peak detection and an integral time constant (R27|R29·C4) determined by the feedback circuit (C4 and R28) in the automatic bias controller 58. In other words, the automatic bias controller 58 performs feed-back control with the frequency range matching those time constants.

The switch SW1 is opened or closed according to the header/data switching signal E231 from the CPU 23. The CPU 23, in advance, is informed of how far away from the sector mark SM at the head of the header portion in FIG. 1C the data portion is located. The CPU 23 can therefore generate the switching signal E231 in association with the data portion in the signal E361, as shown in FIG. 1D.

The switch SW2 is opened or closed by the recording/reproduction switching signal E232 from the CPU 23. The switch SW2 is set on for data reproduction, and set off for data recording.

Figures 1C, 1D:
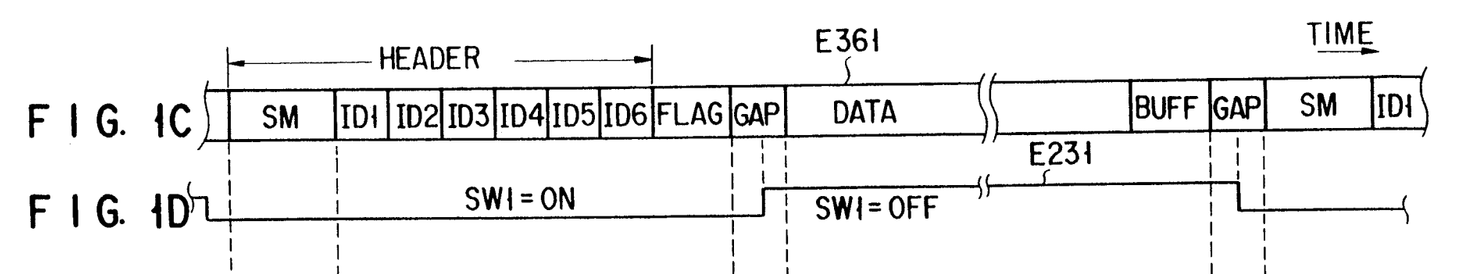
FIGS. 1C to 1E exemplify a signal (header portion and data portion) read out from a disk having the format in FIG. 1B, a time constant switch signal, and the waveform of a data/header signal after signal processing.

As shown in FIG. 1C, there is a gap of several pits between the header portion and the data portion. The automatic bias controller 58 has to respond to the header portion as quickly as possible, or the following data portion will be affected. Consequently, the time constant of the level detection is switched by the switch SW1 to shorten the time period required to achieve the peak detection at the header portion, thus improving the response to the header portion. With the switch SW1 set on, the resistor R26, which is a part of a discharge time constant of the capacitor C3, is shunted by forward resistances of the diodes D3 and D4, thereby reducing the time constant of the detection at the header portion.

Figure 1E:
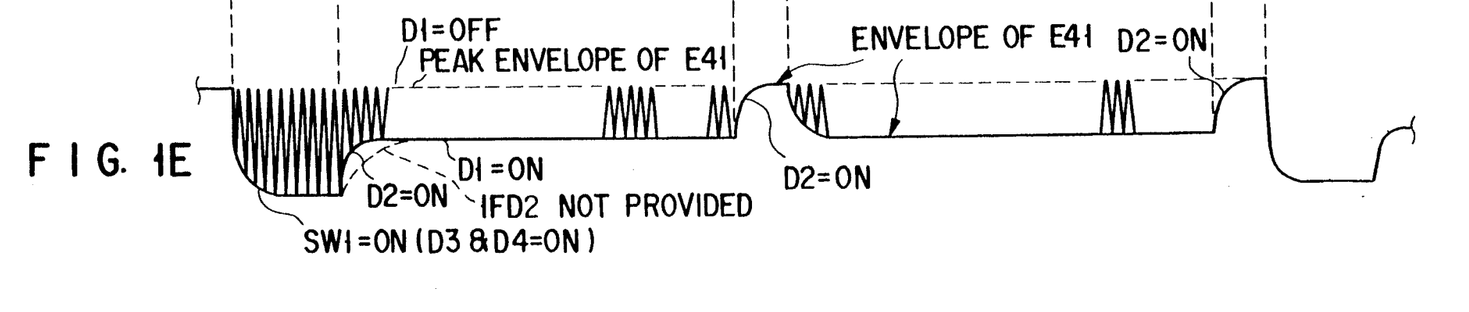

As shown in FIG. 1D, the switch SW1 is rendered off at the data portion. In this case, at the edge of a pit (the rise of an envelope in FIG. 1E), the diode D2 is rendered conductive, so that the response of the automatic bias controller 58 is fast. At the releasing time because no pits are present (the fall of the envelope in FIG. 1E), the diode D2 is rendered nonconductive, so that the response of the automatic bias controller 58 becomes slow. The response at the data portion is therefore stable and the envelope of the signal E41 has a smaller fluctuation at the data portion.

A bias Vbias in the automatic controller 58 is obtained by providing a voltage divider (R27 and R29) between the voltage Vc of +12V and the circuit ground GND. The operational point of the operational amplifier 58a can automatically follow the voltage fluctuation of the voltage Vc, thus simplifying the structure of the bias circuit.

As described above, the data/header signal processor 41 has the switch SW1 set on or off to make the peak detection time of the header portion shorter than that of the data portion, thereby improving the response of the level detection to the header portion.

There is a signal, called the sector mark SM, located at the head of the header portion. This mark SM produces a greater amplitude than the sectors ID1 to ID6 at the header portion. Therefore, the time constant of the peak detection at the header portion is set as follows so as to respond to the mark SM.

The switch SW1 is set on at the arrival of the sector mark SM of the header portion, and the resistor R26 is shunted by the ON-resistances of the diodes D3 and D4. The reason why the two diodes D3 and D4 are connected in series is that a voltage drop (0.6V) of one diode is given to the series-diode circuit, so that even when the switch SW1 closed, the diodes D3 and D4 will not be rendered ON in response to a small-amplitude signal other than the sector mark SM at the head of the header portion, thereby ensuring a steady response.

Figure 5A:
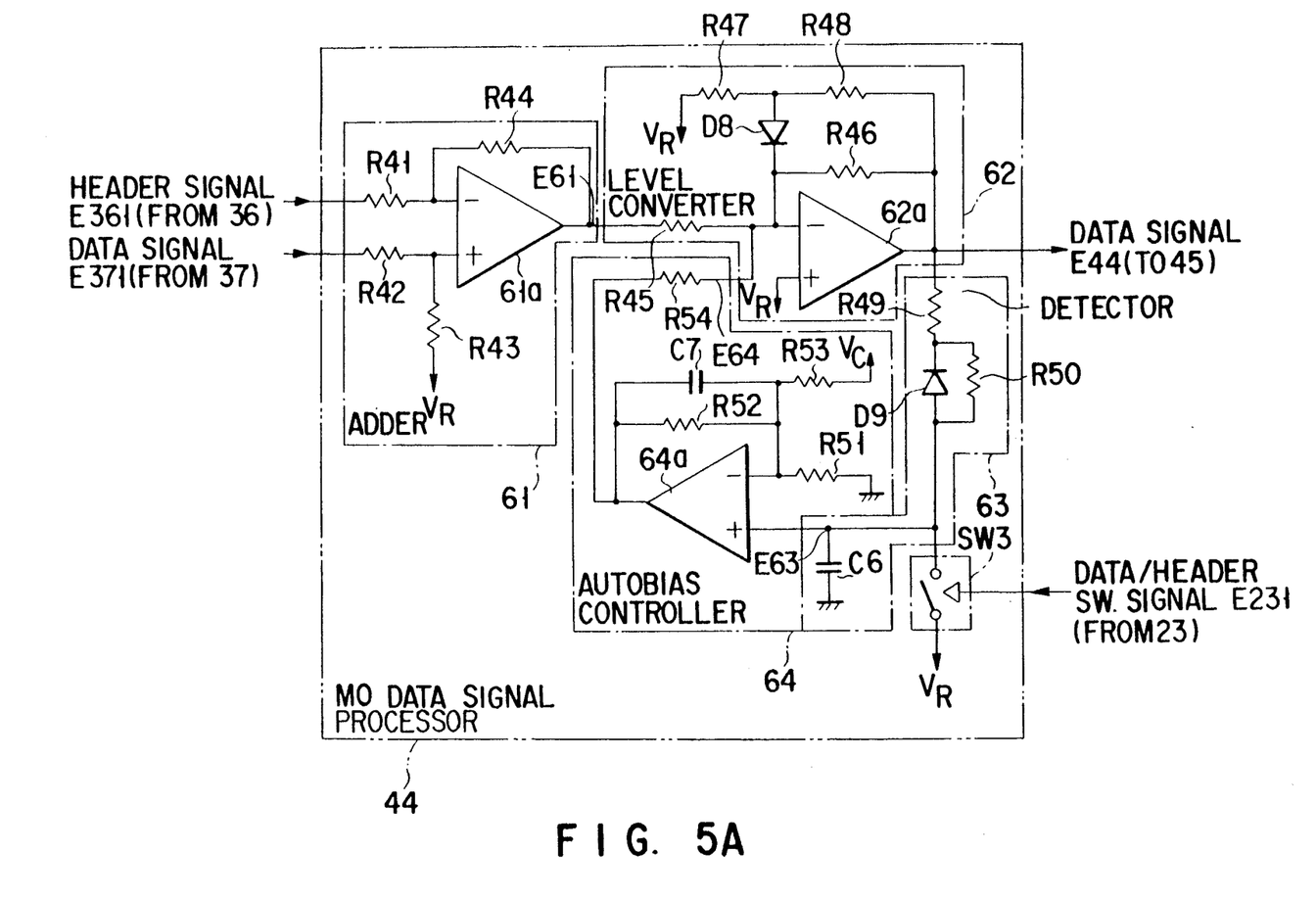
FIG. 5A is a circuit diagram showing a specific example of a magneto optical (MO) data signal processor in FIG. 3.

An MO signal is likewise processed by the MO data signal processor 44 as shown in FIG. 5A. In this processing, although the header portion is processed by a separate system (data/header signal processor 41), the influence of the header portion will appear on the MO signal. This influence will not appear at all in the idealistic conditions but the header signal will leak into an operation detection signal E44 due to a variation in the optical head mounting position or the like. As the header signal should have a large S/N ratio, even a slight signal leakage cannot be ignored compared with the MO signal.

If the above signal leakage occurs, when the MO signal is picked up following the header portion, it becomes difficult to digitize the head of the MO signal. As a countermeasure to this phenomenon, the bias control is performed to apply such a fixed bias as to make the signal leakage negligible.

The MO data signal processor 44 processes the MO data signal E371 supplied from an amplifier 51b in the preamplifier 37. The frequency-response bandwidth control is applied to the feedback loop (integrated circuit constituted by the C17 and the R52) in addition to the peak detection, so that the MO data signal processor 44 can perform the feedback by a proper time constant in accordance with the number of revolutions of an MO disk and its recording density.

The MO data signal processor 44 comprises an adder 61, a level converter 62, a detector 63, an auto bias controller 64, and a switch SW3, as shown in FIG. 5A.

The adder 61 performs an opposite phase addition processing on the header signal E361 sent from the amplifier 51a in the preamplifier 36 and the MO signal E371 supplied from the amplifier 51b in the preamplifier 37. The adder 61 then outputs an MO data signal E61 acquired by excluding the influence of the header portion from the MO signal E371. The adder 61 has resistors R41 to R44 and a differential amplifier 61a, as shown in FIG. 5A.

The level converter 62 performs level conversion on the MO signal E61 sent from the differential amplifier 61a in the adder 61. The level converter 62 comprises an amplifier 62a, resistors R45 to R48, and a diode D8, as shown in FIG. 5A.

Figure 5B:
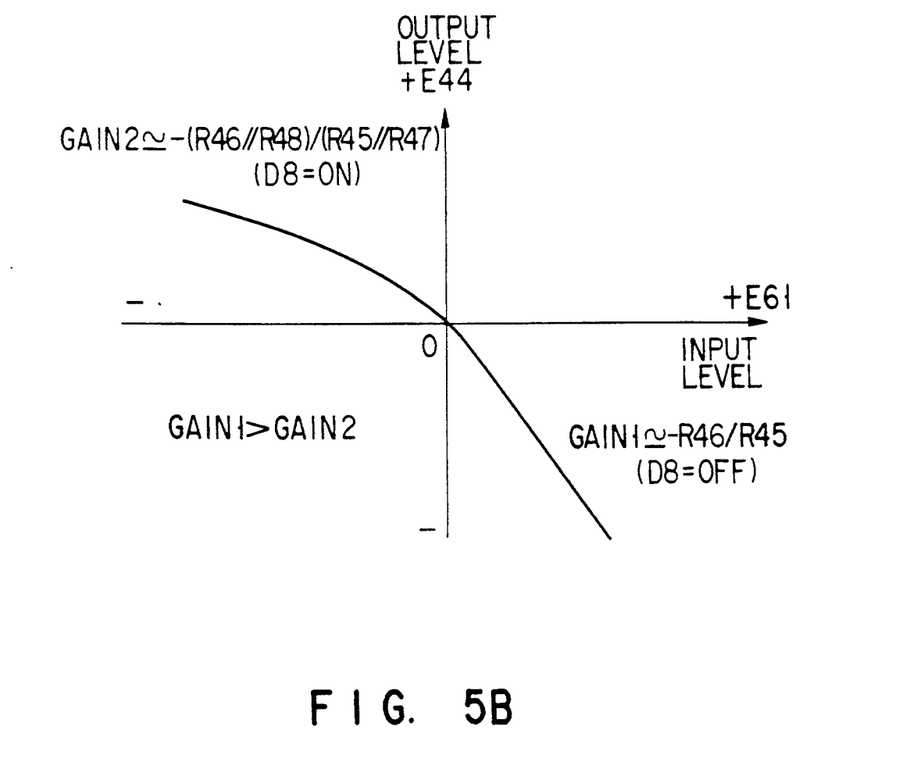
FIG. 5B is a graph exemplifying the input/output characteristic of a level controller in FIG. 5A.

When the potential of the signal E61 is at a higher level than a non-inverted input level VR, the diode D8 is turned off. When the potential of the signal E61 is at a lower level than the non-inverted input level VR, the diode D8 is turned on. The level converter 62 therefore has an input/output characteristic as shown in FIG. 5B. In other words, the level converter 62 serves as a limiter (i.e., "gain 2" is small) with respect to the received signal E61 of a negative level.

The detector 63 detects the peak of a signal E44 supplied from the level converter 62, and comprises resistors R49 and R50, a capacitor C6, and a diode D9 as shown in FIG. 5A.

In response to a peak detection signal E63 from the detector 63, the automatic bias controller 64 controls the bias of the level converter 62. The automatic bias controller 64 includes an operational amplifier 64a, resistors R51 to R53, and an integral capacitor C7 for controlling a frequency response range, as shown in FIG. 5A.

The switch SW3 is opened or closed according to the header/data switching signal E231 from the CPU 23. The switch SW3 is rendered on at the header portion by the signal E231 in FIG. 1D. The automatic bias control is then performed at the reference voltage VR. The switch SW3 is rendered off at the data portion. The automatic bias control is then performed according to the detected level of the signal E44.

A bias Vbias in the automatic bias controller 64 is acquired by providing a voltage divider (R51 and R53) between the voltage Vc of +12V and the circuit ground GND. This bias is obtained in the same manner as that in the automatic bias controller 58.

Figure 6:
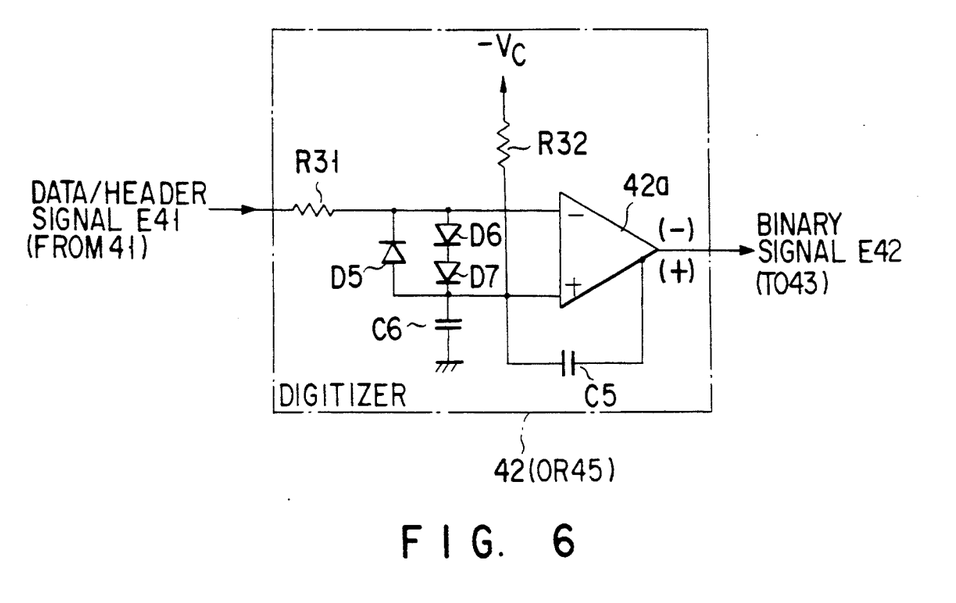
FIG. 6 is a circuit diagram illustrating a specific example of digitizers in FIG. 3.

The digitizer 42 digitizes a data/header signal supplied from the data/header signal processor 41, and comprises a comparator 42a, resistors R31 and R32, diodes D5, D6, and D7, and capacitors C5 and C6.

More specifically, the digitizer 42 performs digitization with a signal after rectified by the diodes D5, D6, and D7. The bright portion of the data signal is likely to be influenced by the returning noise of a laser beam or noise from the disk 1. The potential difference is therefore set large for rectification in the bright direction, using the two diodes D6 and D7, thereby widening the margin with respect to such noise.

The capacitor C5 serves to effect feedback (positive feedback) on the rectified signal (the target for digitization), so that, in a short period immediately after the digitization, the signal is changed in the opposite direction to the direction of change of the data signal. Then, the digitized signal waveform has a sharp edge. This widens the margin for digitization, preventing deformation of digitized data.

The digitizer 45 digitizes a data signal supplied from the MO data signal processor 44, and has the same structure as the digitizer 42.

The demodulator 43 demodulates the digitized signals E42 and E45 sent from the respective digitizers 42 and 45, and outputs the resultant demodulation signal E19 as a reproduced signal.

Figure 7:
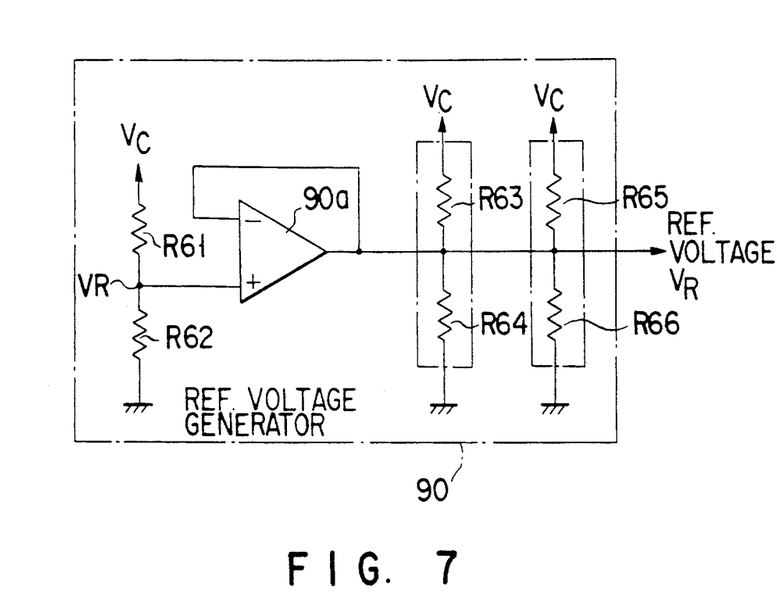
FIG. 7 shows a specific example of a reference voltage generator used in the signal processors shown in FIGS. 4A and 5A.

The reference voltage generator 90 generates the reference voltage VR to be used in the individual circuits in the video signal processor 19, and comprises an amplifier 90a and resistors R61 to R66.

More specifically, the reference voltage generator 90 is designed to temporarily generate the voltage VR by a voltage divider including the resistors R65 and R66 and having a sufficiently low resistance than that of a voltage divider including the resistors R63 and R64, and is designed to supply only the changed portion in the voltage VR from the amplifier 90a. Then, an amplifier with a small output current can be used for the amplifier 90a, thus allowing an inexpensive and small amplifier 90a to generate a sufficient reference voltage VR.

As described in detail above, the present invention can provide a signal processing circuit for a disk apparatus, which can effect bias control insensitive to the interfering noise or the like to thereby ensure the optimal feedback control.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A signal processing circuit for a disk apparatus having an optical head which includes means for detecting light acquired by irradiating light from a light source to a disk having an address portion and a data portion recorded thereon, and for photoelectric-converting the light detected by said detecting means to provide a detection signal, comprising:
    means for converting a signal level of the detection signal from said detecting means to provide an output signal;
    means for sensing a level of the output signal from said converting means so that time constants for the sensing are switched between the address portion and the data portion of said disk; and
    means for changing a level of the output signal from said converting means in accordance with the output signal level from said sensing means.

2. An information reproduction apparatus using a light beam to be radiated onto a recording medium to which information containing an address portion and a data portion is recorded, said apparatus comprising:
    means for radiating the light beam to the address and data portions of said recording medium so as to provide a first signal having information of either of the address and data portions; and
    means for converting with a first time constant the address portion of said first signal into a second signal, and converting with a second time constant the data portion of said first signal into the second signal, said first time constant being different from said second time constant.

* * * * *